US010711077B2

(12) United States Patent
Zhang et al.

(10) Patent No.: US 10,711,077 B2
(45) Date of Patent: *Jul. 14, 2020

(54) ZIEGLER-NATTA CATALYST COMPOSITION WITH CONTROLLED MORPHOLOGY

(75) Inventors: Lei Zhang, Seabrook, TX (US); Kenneth Blackmon, Houston, TX (US); David Rauscher, Angleton, TX (US)

(73) Assignee: Fina Technology, Inc., Houston, TX (US)

(*) Notice: Subject to any disclaimer, the term of this patent is extended or adjusted under 35 U.S.C. 154(b) by 302 days.

This patent is subject to a terminal disclaimer.

(21) Appl. No.: 13/022,021

(22) Filed: Feb. 7, 2011

(65) Prior Publication Data

US 2012/0202955 A1 Aug. 9, 2012

(51) Int. Cl.
*B01J 31/00* (2006.01)
*B01J 31/38* (2006.01)
*C08F 10/00* (2006.01)
*C08F 110/02* (2006.01)

(52) U.S. Cl.
CPC ............ *C08F 10/00* (2013.01); *C08F 110/02* (2013.01)

(58) Field of Classification Search
CPC ...... B01L 31/0202; B01L 31/38; B01L 37/06; C08F 4/60; C08F 4/6024; C08F 4/6026
USPC ......................................................... 526/352
See application file for complete search history.

(56) References Cited

U.S. PATENT DOCUMENTS

| | | | |
|---|---|---|---|
| 4,199,476 A * | 4/1980 | Melquist et al. ............ | 502/110 |
| 4,271,060 A | 6/1981 | Hubby | |
| 4,543,399 A | 9/1985 | Jenkins, III et al. | |
| 4,588,790 A | 5/1986 | Jenkins, III et al. | |
| 5,001,205 A | 3/1991 | Hoel | |
| 5,028,670 A | 7/1991 | Chinh et al. | |
| 5,236,998 A | 8/1993 | Lundeen et al. | |
| 5,317,036 A | 5/1994 | Brady, III et al. | |
| 5,352,749 A | 10/1994 | DeChellis et al. | |
| 5,405,922 A | 4/1995 | DeChellis et al. | |
| 5,436,304 A | 7/1995 | Griffin et al. | |
| 5,462,999 A | 10/1995 | Griffin et al. | |
| 5,525,678 A | 6/1996 | Mink et al. | |
| 5,589,555 A | 10/1996 | Zboril et al. | |
| 5,616,661 A | 4/1997 | Eisinger et al. | |
| 5,627,242 A | 5/1997 | Jacobsen et al. | |
| 5,663,248 A | 9/1997 | Garoff et al. | |
| 5,665,818 A | 9/1997 | Tilston et al. | |
| 5,668,228 A | 9/1997 | Chinh et al. | |
| 5,677,375 A | 10/1997 | Rifi et al. | |
| 5,945,366 A | 8/1999 | Kataoka et al. | |
| 6,054,406 A | 4/2000 | Smith | |
| 6,147,173 A | 11/2000 | Holtcamp | |
| 6,174,971 B1 * | 1/2001 | Chen .................. | C08F 10/00 526/125.3 |
| 6,180,735 B1 | 1/2001 | Wenzel | |
| 6,207,606 B1 | 3/2001 | Lue et al. | |
| 6,211,105 B1 | 4/2001 | Holtcamp | |
| 6,242,545 B1 | 6/2001 | Jejelowo et al. | |
| 6,245,705 B1 | 6/2001 | Kissin | |
| 6,245,868 B1 | 6/2001 | Agapiou et al. | |
| 6,248,845 B1 | 6/2001 | Loveday et al. | |
| 6,271,323 B1 | 8/2001 | Loveday et al. | |
| 6,274,684 B1 | 8/2001 | Loveday et al. | |
| 6,300,436 B1 | 10/2001 | Agapiou et al. | |
| 6,339,134 B1 | 1/2002 | Crowther et al. | |
| 6,340,730 B1 | 1/2002 | Murray et al. | |
| 6,346,586 B1 | 2/2002 | Agapiou et al. | |
| 6,359,072 B1 | 3/2002 | Whaley | |
| 6,380,328 B1 | 4/2002 | McConville et al. | |
| 6,399,837 B1 | 6/2002 | Wilson et al. | |
| 6,420,580 B1 | 7/2002 | Holtcamp et al. | |
| 6,734,134 B1 * | 5/2004 | Gray .................. | C08F 10/00 502/107 |

(Continued)

FOREIGN PATENT DOCUMENTS

| | | | | |
|---|---|---|---|---|
| EP | 0113937 | * | 7/1984 | ............. C08F 10/00 |
| EP | 0494084 B1 | | 10/2012 | |
| WO | 2011/133313 A1 | | 10/2011 | |
| WO | 2012/036785 A1 | | 3/2012 | |

OTHER PUBLICATIONS

Extended European Search Report issued in European Application No. 12745085.6-1301 dated Jun. 3, 2014 (6 pages).

International Search Report issued in International Application No. PCT/US12/22462 dated Oct. 12, 2012 (3 pages).

*Primary Examiner* — Rip A Lee
(74) *Attorney, Agent, or Firm* — Albert Shung

(57) ABSTRACT

Catalyst Systems, processes of forming the same and polymers and polymerization processes are described herein. The process of forming the catalyst system generally includes providing a first compound including a magnesium dialkoxide and aluminum alkoxide: contacting the first compound with a first agent and a second agent to form a solution of reaction product "A", the first agent including a titanating agent and the second agent including a first metal halide; contacting the solution of reaction product "A" with a third agent to form a solid reaction product "B", the third agent including a second metal halide: contacting the solid reaction product "B" with a fourth agent to form a solid reaction product "C", the fourth agent including a third metal halide: optionally contacting the solid reaction product "C" with a fifth agent to form a solid reaction product "D", the fifth agent including a fourth metal halide; and contacting the solid reaction product "C" or "D" with a sixth agent to form a catalyst component, the sixth agent including a first organoaluminum compound.

10 Claims, 1 Drawing Sheet

(56) References Cited

U.S. PATENT DOCUMENTS

| | | | |
|---|---|---|---|
| 6,864,207 B2* | 3/2005 | Knoeppel | C08F 10/00 502/110 |
| 7,169,727 B2 | 1/2007 | Thorman | |
| 7,473,664 B2* | 1/2009 | Vizzini | B01J 31/122 502/103 |
| 7,655,590 B2* | 2/2010 | Enriquez | C08F 10/00 502/103 |
| 2001/0008869 A1 | 7/2001 | Garoff et al. | |
| 2003/0018143 A1* | 1/2003 | Gray | C08F 10/00 526/119 |
| 2004/0058802 A1* | 3/2004 | Knoeppel | C08F 10/00 502/102 |
| 2007/0060725 A1 | 3/2007 | Zoeckler et al. | |
| 2007/0299224 A1* | 12/2007 | Vizzini | B01J 31/122 526/176 |
| 2009/0203856 A1 | 8/2009 | Vizzini et al. | |
| 2010/0203277 A1* | 8/2010 | Michie, Jr. | C08F 210/16 428/36.92 |
| 2011/0263802 A1* | 10/2011 | Zhang | C08F 10/00 526/124.2 |
| 2012/0046429 A1* | 2/2012 | Zhang | C08F 10/00 526/151 |

* cited by examiner

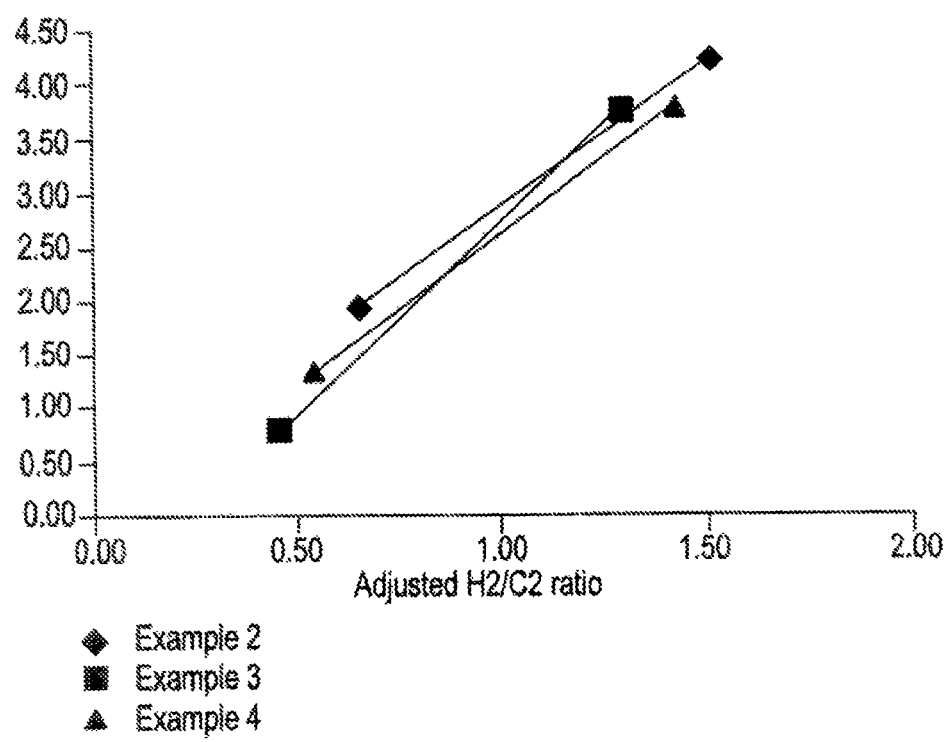

ZIEGLER-NATTA CATALYST COMPOSITION WITH CONTROLLED MORPHOLOGY

FIELD

Embodiments of the present invention generally relate to Ziegler-Natta type catalysts and processes for forming Ziegler-Natta type catalyst systems.

BACKGROUND

Many processes for forming Ziegler-Natta catalyst systems are known. Known processes can include adding specialty titanium blends during catalyst production to control catalyst morphology. However, the use of certain known titanium blends can be expensive and can generate excess solvent waste during catalyst production. Therefore, it is desirable to develop processes for forming Ziegler-Natta catalysts that can eliminate the need of expensive specialty titanium blends, reduce or minimize the usage of titanium alkoxides and use less solvent, while also maintaining well-controlled catalyst morphology, having high catalyst activity, and producing good morphology polymers.

SUMMARY

Embodiments of the present invention include processes of forming catalyst systems. The process generally includes providing a first compound including a magnesium dialkoxide and aluminum alkoxide: contacting the first compound with a first agent and a second agent to form a solution of reaction product "A", the first agent including a titanating agent and the second agent including a first metal halide: contacting the solution of reaction product "A" with a third agent to form a solid reaction product "B", the third agent including a second metal halide; contacting the solid reaction product "B" with a fourth agent to form a solid reaction product "C", the fourth agent including a third metal halide; optionally contacting the solid reaction product "C" with a fifth agent to form a solid reaction product "D", the fifth agent including a fourth metal halide: and contacting the solid reaction product "C" or "D" with a sixth agent to form a catalyst component, the sixth agent including a first organoaluminum compound.

On or more embodiments include the process of the preceding paragraph, wherein the first compound is formed by contacting an alkyl magnesium compound and a second organoaluminum compound and an alcohol.

One or more embodiments include the process of any preceding paragraph, wherein the alkyl magnesium compound is selected from butyl ethyl magnesium, diethyl magnesium, dipropyl magnesium, dibutyl magnesium and combinations thereof.

One or more embodiments include the process of any preceding paragraph, wherein the second organoaluminum compound is selected from triethyl aluminum, trimethyl aluminum, triisobutyl aluminum and combinations thereof.

One or more embodiments include the process of any preceding paragraph, wherein the second organoaluminum compound contacts the the alkyl magnesium compound in an equivalent of from about 0.1 to about 0.5.

One or more embodiments include the process of any preceding paragraph, wherein the alcohol is selected from 2-ethylhexanol, butanol, isobutanol and combinations thereof.

One or more embodiments include the process of any preceding paragraph, wherein the first agent includes a titanium alkoxide.

One or more embodiments include the process of any preceding paragraph, wherein the first agent includes titanium isopropoxide (Ti(O$^i$Pr)$_4$) or TNBT.

One or more embodiments include the process of any preceding paragraph, wherein the first agent contacts the first compound in an equivalent of from about 0.1 to about 1.5.

One or more embodiments include the process of any preceding paragraph, wherein the second agent contacts the first compound in an equivalent of from about 0.1 to about 5.

One or more embodiments include the process of any preceding paragraph, wherein the second agent, the third agent, the fourth agent and the fifth agent each include titanium tetrachloride (TiCl$_4$).

One or more embodiments include the process of any preceding paragraph, wherein the sixth agent includes an organoaluminum compound selected from triethyl aluminum, trimethyl aluminum, triisobutyl aluminum and combinations thereof.

One or more embodiments include a Ziegler-Natta catalyst formed from the process of any preceding paragraph.

One or more embodiments include polymerization processes. The polymerization process generally includes introducing an olefin monomer into a reaction zone: contacting the olefin monomer with a Ziegler-Natta catalyst formed from the process of any preceding paragraph to form a polyolefin; and withdrawing the polyolefin from the reaction zone.

One or more embodiments include polyethylene formed from the process of the preceding paragraph.

BRIEF DESCRIPTION OF DRAWINGS

FIG. 1 illustrates a graph of catalyst hydrogen response for certain Examples of Ziegler-Natta catalysts.

DETAILED DESCRIPTION

Introduction and Definitions

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, bin not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition skilled persons in the pertinent art have given that term as reflected in printed publications and issued patents at the time of filing. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations.

As used herein, the term "activity" refers to the weight of product produced per weight of the catalyst used in a process per hour of reaction at a standard set of conditions (e.g., grams product per grams catalyst per hour).

As used herein, the term "blend" refers to a mixture of compounds that are blended and/or mixed prior to contact with another compound.

As used herein, the term "ethylene based polymers" is used interchangeably with the terms "ethylene polymer" or "polyethylene" and refers to a polymer having at least about 50 wt. % (weight percent), or at least about 70 wt. %, or at least about 75 wt. %, or at least about 80 wt. %, or at least about 85 wt. %, or at least about 90 wt. % polyethylene relative to the total weight of polymer, for example.

As used herein, the term "equivalent" refers to a molar ratio of a component to a starting material, which as used herein, may be the alkyl magnesium compound or the magnesium dialkoxide compound, in some embodiments.

As used herein, the term "medium density polyethylene" refers to ethylene based polymers having a density of from about 0.92 g/cc (gram per cubic centimeter) to about 0.94 g/cc or from about 0.926 g/cc to about 0.94 g/cc, for example.

As used herein, the term "high density polyethylene" refers to ethylene based polymers having a density of from about 0.94 g/cc to about 0.97 g/cc, for example.

As used herein, the term "melt flow index" refers to a measure of the ease of flow of the melt of a thermoplastic polymer and is measured via ASTM-D-1238-E.

As used herein, the term "melt index ratio" refers to a ratio between two melt flow rates at different gravimetric weights and is measured via ASTM-D-1238-F.

As used herein, the term "molecular weight distribution" (MWD) refers to the ratio of the weight average molecular weight to the number average molecular weight ($M_w/M_n$) of a polymer.

As used herein, the term "particle size distribution" refers to a list of values or a mathematical function that defines the relative amounts of particles present, sorted according to size.

As used herein, the term "polymer density" refers to a measurement of the mass per unit volume of a polymer and is measured via ASTM-D-1238.

As used herein, the term "room temperature" includes a temperature of from about 20° C. to about 28° C. (68° F. (degrees Fahrenheit) to about 82° F.) However, room temperature measurements generally do not include close monitoring of the temperature of the process and therefore such a recitation does not intend to bind the embodiments described herein to any predetermined temperature range. Furthermore, a temperature difference of a few degrees does not matter to the phenomenon under investigation, such as a preparation method.

As used herein, the term "solution" refers to a homogenous mixture of two or more compounds.

As used herein, the term "substituted" refers to an atom, radical or group that replaces hydrogen in a chemical compound.

Catalyst Systems

Ziegler-Natta catalyst systems are generally formed from the combination of a metal component (e.g., a catalyst precursor) with one or more additional components, such as a catalyst support, a cocatalyst and/or one or more electron donors, for example.

A specific example of a Ziegler-Natta catalyst includes a metal component generally represented by the formula:

$$MR^A_x:$$

wherein M is a transition metal, $R^A$ is a halogen, an alkoxy, a hydrocarboxyl an imino or an amido group, and x is the valence of the transition metal. For example, x may be from 1 to 4.

The transition metal may be selected from Groups IV through VIB (e.g., titanium, vanadium or chromium), for example. $R^A$ may be selected from chlorine, bromine, carbonates, esters or alkoxy groups in one embodiment. Examples of catalyst components include $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$, for example.

Those skilled in the art will recognize that a catalyst may be "activated" in some way before it is useful for promoting polymerization. As discussed further below, activation may be accomplished by contacting the catalyst with a Ziegler-Natta activator (Z-N activator), which is also referred to in some instances as a "cocatalyst." Embodiments of such Z-N activators include organoaluminum compounds, such as triethyl aluminum (TEAl), trimethyl aluminum (TMA) and triisobutyl aluminum (TIBAl), for example.

The Ziegler-Natta catalyst system may further include one or more electron donors, such as internal electron donors and/or external electron donors. Internal electron donors may be used to reduce the atactic form of the resulting polymer, thus decreasing the amount of xylene solubles in the polymer. The internal electron donors may include amines, amides, esters, ketones, nitriles, ethers, phosphines, diethers, succinates, phthalates or dialkoxybenzenes, for example. (See. U.S. Pat. Nos. 5,945,366 and 6,399,837, which are incorporated by reference herein.)

External electron donors may be used to further control the amount of atactic polymer produced. The external electron donors may include monofunctional or polyfunctional carboxylic acids, carboxylic anhydrides, carboxylic esters, ketones, ethers, alcohols, lactones, organophosphorus compounds and/or organosilicon compounds. In one embodiment, the external donor may include diphenyldimethoxysilane (DPMS), cyclohexymethyldimethoxysilane (CDMS), diisopropyldimethoxysilane and/or dicyclopentyldimethoxysilane (CPDS), for example. The external donor may be the same or different from the internal electron donor used.

The components of the Ziegler-Natta catalyst system (e.g., catalyst, activator and/or electron donors) may or may not be associated with a catalyst support, either in combination with each other or separate from one another. The catalyst support can be an inert solid which is chemically unreactive with any of the components of the conventional Ziegler-Natta catalyst. The Ziegler-Natta catalyst support materials may include a magnesium dihalide, such as magnesium dichloride or magnesium dibromide, or silica, for example.

Efforts to form improved Ziegler-Natta catalyst generally included the methods described in U.S. Pat. Nos. 6,734,134 and 6,174,971, which are incorporated by reference herein. As described in such patents, processes for forming Ziegler-Natta catalyst systems can include adding titanium blends during catalyst production to control catalyst morphology. Such titanium blends, for example, $ClTi(O^iPr)_3$ (chlorotitaniumtriisopropoxide) and $TiCl_4$/TNBT (titanium tetrachloride/tetra n-butyl titanate), can be expensive and can generate excess solvent waste during catalyst production.

It is desirable to manufacture low cost, less complex, high batch yield Ziegler-Natta catalyst and intermediates that generate less solvent waste during catalyst production by eliminating the usage of titanium blends. It is further desirable to simplify the usage of titanium alkoxides during catalyst production while still maintaining controlled catalyst morphology, having high catalyst activity, and producing good morphology polymers.

Embodiments of the invention are capable of eliminating the usage of high cost blended components while unexpectedly forming catalysts capable of forming polymers having properties similar to that formed with expensive blended components. Further, such embodiments are capable of reducing the amount of solvent required (and thereby reducing the cost/requirements of disposal of such solvents) in the process compared to processes utilizing blended components. In particular, the amount of solvent utilized in the precipitation step (i.e., forming reaction product "B" in the reaction scheme illustrated below) can be reduced by at least 40%, or at least 50% or at least 60% in comparison to such processes utilizing expensive blended components, for example. As a result of the reduced solvent, the amount of starting materials can be doubled, thereby to increase the final catalyst batch yield.

Embodiments of the invention modify such process schemes via a representative, non-limiting, illustration as illustrated as follows:

$$MgR^1R^2 + AlR^6{}_3 + 2R^3OH \rightarrow Mg(OR^3)_2 \qquad 1)$$

$$Mg(OR^3)_2 + A(OR^4)_x + TiCl_4 \rightarrow \text{"A"} \qquad 2)$$

$$\text{"A"} + TiCl_4 \rightarrow \text{"B"} \qquad 3)$$

$$\text{"B"} + TiCl_4 \rightarrow \text{"C"} \qquad 4)$$

$$\text{"C"} + TiCl_4 \rightarrow \text{"D"} \qquad 5)$$

$$\text{"D"} + AlR^6{}_3 \rightarrow \text{Catalyst} \qquad 6)$$

Note that while the primary reaction components are illustrated above, additional components may be reaction products, or used in such reactions, and not illustrated above. Further, while described herein in terms of primary reaction steps, it is known to those skilled in the art that additional steps may be included in the reaction schemes and processes described herein (e.g., washing, filtering, drying or decanting steps), while it is further contemplated that other steps may be eliminated in certain embodiments. In addition, it is contemplated that any of the agents described herein may be added in combination with one another so long as the order of addition complies with the spirit of the invention.

Such methods generally include contacting a mixture of an alkyl magnesium compound and the organoaluminum compound with an alcohol to form a magnesium-aluminum alkoxide blend. Such reaction may occur at a reaction temperature ranging from room temperature to about 90° C. for a time of up to about 10 hours, for example.

The alcohol may be added to the mixture of alkyl magnesium compound and the organoaluminum compound in an equivalent of from about 2 to about 6, or from about 2.1 to about 4, or from 2.5 to 3, for example, so as to completely convert all reducing alkyl magnesium compound and organaluminum compound to non-reducing magnesium-aluminum alkoxides.

The alkyl magnesium compound may generally be represented by the following formula (I):

$$MgR^1R^2: \qquad (I)$$

wherein $R^1$ and $R^2$ are independently selected from $C_1$ to $C_{10}$ alkyl groups. Non-limiting illustrations of alkyl magnesium compounds include butyl ethyl magnesium (BEM), diethyl magnesium, dipropyl magnesium and dibutyl magnesium, for example. The alcohol may generally be represented by the formula (III):

$$R^3OH: \qquad (III)$$

wherein $R^3$ is selected from $C_2$ to $C_{20}$ linear or branched alkyl groups. Non-limiting illustrations of alcohols generally include 2-ethylhexanol, butanol and isobutanol, for example.

The organoaluminum compound may generally be represented by the following formula (II):

$$AlR^6{}_3: \qquad (II)$$

wherein $R^6$ is a $C_1$ to $C_{10}$ alkyl compound. Non-limiting illustrations of organoaluminum compounds include aluminum alkyl compounds generally including triethyl aluminum (TEAl), trimethyl aluminum (TMA), triisobutyl aluminum (TIBAl), n-octyl aluminum and n-hexyl aluminum, for example.

The organoaluminum may be added in an amount sufficient to reduce the viscosity of subsequent magnesium alkoxide in order to achieve better catalyst morphology control. For example, the organoaluminum compound may be added to the alkyl magnesium compound in an equivalent of from about 0.03:1 to about 1:1 or from about 0.1:1 to about 0.5:1, for from about 0.10:1 to about 0.25:1 (organoaluminum to alkyl magnesium) for example.

While the contact of the magnesium alkyl with the organoaluminum compound occurs before the addition of the alcohol in one or more embodiments, it is contemplated that the organoaluminum compound and magnesium alkyl may contact with the alcohol first before being mixed together in one or more embodiments.

The method may then include contacting the magnesium dialkoxide and aluminum alkoxide compounds with a first agent and a second agent to form a reaction product "A", such as a solution of reaction product "A".

Such reaction may occur in the presence of an inert solvent. A variety of hydrocarbons can be used as the inert solvent, but any hydrocarbon selected should remain in liquid form at all relevant reaction temperatures, and the ingredients used to form the supported catalyst composition should be at least partially soluble in the hydrocarbon. Accordingly, the hydrocarbon is considered to be a solvent herein, even though in certain embodiments the ingredients are only partially soluble in the hydrocarbon.

Suitable hydrocarbon solvents include substituted and unsubstituted aliphatic hydrocarbons and substituted and unsubstituted aromatic hydrocarbons. For example, the inert solvent may include hexane, heptane, octane, decane, toluene, xylene, dichloromethane, chloroform, 1-chlorobutane or combinations thereof, for example.

The reaction may further occur at a temperature of from about 0° C. to about 100° C., or from about 20° C. to about 90° C., or from about 20° C. to about 50° C., for a time of from about 0.2 hours to about 24 hours, or from about 0.5 hour to about 12 hours from about 1 hour to about 4 hours, for example.

The first agent may generally be represented by the following formula (IV):

$$A(OR^4)_x: \qquad (IV)$$

wherein A is selected from titanium, silicon, aluminum, carbon, tin and germanium. $R^4$ is selected from $C_1$ to $C_{10}$ linear or branched alkyls, such as methyl, ethyl, propyl and isopropyl, and x is the valence of A. Non-limiting illustrations of first agents include titanating agents such as titanium alkoxides comprising titanium isopropoxide (Ti(O$^i$Pr)$_4$), titanium n-butoxide (TNBT), and combinations thereof, for example. The first agent may be added in an equivalent of from about 0.1 to about 1.5. or from 0.5 to about 1.0, or from about 0.5 to about 0.75, for example.

Non-limiting illustrations of second agents include metal halides. The metal halides may include any metal halide known to one skilled in the art, such as titanium tetrachloride (TiCl$_4$), for example. The second agent may be added in an equivalent of from about 0.1 to about 5, or from about 0.1 to about 0.5, or from about 0.25 to about 0.5, for example.

While the contact of the magnesium dialkoxide and aluminum alkoxide with the second agent occurs in the presence of the first agent in one or more embodiments, it is contemplated that the second agent may contact the mixture of magnesium dialkoxide and aluminum alkoxide before contact with the first agent.

The method further includes contacting reaction product "A", such as the solution of reaction product "A", with a third agent to form a reaction product "B", such as a solid reaction product "B".

Non-limiting illustrations of third agents include metal halides. The metal halides may include any metal halide known to one skilled in the art, such as titanium tetrachloride (TiCl$_4$), for example. The third agent may be added in an equivalent of from about 0.1 to about 5, or from about 1 to about 4, or from about 2 to about 3, for example.

Such reaction may occur in the presence of an inert solvent. The inert solvents may include any of those solvents previously discussed herein, for example.

The method further includes contacting reaction product "B", such as the solid reaction product "B", with a fourth agent to form a reaction product "C", such as a solid reaction product "C". Such reaction may occur in the presence of an inert solvent such as hexane. Alternatively, the inert solvent may include any of those solvents previously discussed herein, for example. The reaction may further occur at room temperature, for example.

Non-limiting illustrations of fourth agents include metal halides. The metal halides may include any metal halide known to one skilled in the art, such as titanium tetrachloride (TiCl$_4$), for example. The fourth agent may be added in a equivalent of from about 0.1 to about 5, or from about 1 to about 4, or from about 2 to about 2.5, for example.

Optionally, the method further includes contacting reaction product "C", such as the solid reaction product "C", with a fifth agent to form a reaction product "D", such as solid reaction product "D". Such reaction may occur in the presence of an inert solvent such as hexane. Alternative, the inert solvent may include any of those solvents previously discussed herein, for example. The reaction may further occur at room temperature, for example.

Non-limiting illustrations of fifth agents include metal halides. The metal halides may include any metal halide known to one skilled in the art, such as titanium tetrachloride (TiCl$_4$), for example. The fifth agent may be added in an equivalent of from about 0.1 to about 5, or from about 1 to about 4, or from about 1 to about 1.5, for example.

The method may further include contacting reaction product "C" or "D", such as the solid reaction product "C" or "D", with a sixth agent to form a Ziegler-Natta catalyst component. The sixth agent may be selected from organolithium compounds, organomagnesium compounds, organoaluminum compounds and combinations thereof, for example.

The sixth agent may be added to the reaction product "D" in an equivalent of from about 0.1 to about 1.0. or from 0.16 to about 0.5, or from 0.16 to about 0.25, for example.

Non-limiting illustrations of sixth agents include organoaluminum compounds. The organoaluminum compounds may include aluminum alkyls having the following formula (V):

$$AlR^6{}_3: \qquad (V)$$

wherein $R^6$ is a $C_1$ to $C_{10}$ alkyl compound. Non-limiting illustrations of the aluminum alkyl compounds generally include triethyl aluminum (TEAl), trimethyl aluminum (TMA), triisobutyl aluminum (TIBAl), n-octyl aluminum and n-hexyl aluminum, for example.

In one or more embodiments, the catalyst has an average particle size in a range of from about 3 microns to about 15 microns, or from about 4 microns to about 12 microns, or from 4 microns to 9 microns.

Polymerization Processes

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See. U.S. Pat. Nos. 5,525,678; 6,420,580; 6,380,328; 6,359,072; 6,346,586; 6,340,730; 6,339,134; 6,300,436; 6,274,684; 6,271,323; 6,248,845; 6,245,868; 6,245,705; 6,242,545; 6,211,105; 6,207,606; 6,180,735 and 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. The monomers may include olefinic unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. Nos. 4,271,060, 5,001,205, 5,236,998 and 5,589,555, which are incorporated by reference herein.

One example of a gas phase polymerization process includes a continuous cycle system, wherein a cycling gas stream (otherwise known as a recycle stream or fluidizing medium) is healed in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig (pound-force per square inch gauge), or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example. U.S. Pat. Nos. 4,543,399; 4,588,790; 5,028,670; 5,317,036; 5,352,749; 5,405,922; 5,436,304; 5,456,471; 5,462,999; 5,616,661; 5,627,242; 5,665,818; 5,677,375 and 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process. However, a process may be a bulk process, a slurry process or a bulk slurry process, for example.

In a specific embodiment, a slurry process or a bulk process may be carried out continuously (in series, parallel or combinations thereof) in one or more loop reactors. The catalyst, as slurry or as a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 45 bar and a temperature of from about 38° C. to about 121° C., for example. Reaction heat may be removed through the loop wall via any method known to one skilled in the art, such as via a double-jacketed pipe.

Alternatively, other types of polymerization processes may be used, such as stirred reactors in series, parallel or combinations thereof, for example. Upon removal from the reactor, the polymer may be passed to a polymer recovery system for further processing, such as addition of additives and/or extrusion, for example.

Polymer Product

The polymers (and blends thereof) formed via the processes described herein may include, but are not limited to, linear low density polyethylene, elastomers, plastomers, high density polyethylenes, low density polyethylenes, medium density polyethylenes, polypropylene (e.g., syndiotactic, atactic and isotactic) and polypropylene copolymers, for example.

Unless otherwise designated herein, all testing methods are the current methods at the lime of filing.

In one or more embodiments, the polymers include ethylene based polymers.

The ethylene based polymers may have a density (as measured by ASTM-D-792) of from about 0.86 g/cc to about 0.98 g/cc, or from about 0.88 g/cc to about 0.965 g/cc, or from about 0.90 g/cc to about 0.965 g/cc, or from about 0.925 g/cc to about 0.97 g/cc, for example.

Such ethylene based polymers may have a molecular weight distribution of at least 4 oral least 5, for example.

The ethylene based polymers may have a melt strength of from about 6.5 cN (centinewton) to about 11 cN, or from about 7 cN to about 11 cN or from about 7 cN to about 10 cN, for example.

The ethylene based polymers may have a melt flow index ($MI_2$) (as measured by ASTM-D-1238-E) of from about 0.01 dg/min. (decigram per minute) to about 100 dg/min., or from about 0.01 dg/min. to about 25 dg/min., or from about 0.03 dg/min. to about 15 dg/min. or from about 0.05 dg/min. to about 10 dg/min. for example.

The ethylene based polymers may have a melt How index ($MI_5$) (as measured by ASTM-D-1238-E) of from about 0.1 dg/min to about 20 dg/min. or from about 1 dg/min to about 15 dg/min. or from about 2 dg/min to about 10 dg/min.

The ethylene based polymers may have a melt index ratio $I_{21}$ (as measured by ASTM-D-1238-F) of at least about 20, or at least about 30, at least about 40, at least about 50 or at least about 55, for example.

In one or more embodiments, the polymers include low density polyethylene.

In one or more embodiments, the polymers include linear low density polyethylene.

In one or more embodiments, the polymers include medium density polyethylene.

In one or more embodiments, the polymers include high density polyethylene.

Product Application

The polymers and blends thereof are useful in applications known to one skilled in the art, such as forming operations (e.g., film, sheet, pipe and fiber extrusion and co-extrusion as well as blow molding, injection molding and rotary molding). Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, sheets, such as thermoformed sheets (including profiles and plastic corrugated cardboard), geomembranes and pond liners, for example. Molded articles include single and multi-layered constructions in the form of bottles, tanks, large hollow articles, rigid food containers and toys, for example.

EXAMPLES

All Ziegler-Natta catalyst examples and their intermediates were prepared in a 500 mL (milliliter) glass reactor equipped with four Morten's indentions, a dropping funnel and an overhead agitation system, including a glass shaft and a four-blade Teflon. All operation was conducted under nitrogen protection at room temperature. The agitation rate was 250 RPM (revolutions per minute) unless otherwise stated.

As used herein, "BEM" refers to 20 wt. % solution of butyl ethyl magnesium (containing 0.12 wt. % Al in the form of TEAl).

As used herein, "TEAl" refers to triethyl aluminum.

As used herein, "2-EHOH" refers to 2-ethylhexanol.

As used herein, "Mg(2-EHO)$_2$" refers to magnesium dialkoxide.

As used herein, "Ti(O$^i$Pr)$_4$" refers to titanium isopropoxide.

As used herein, "ClTi(O$^i$Pr)$_3$" refers to chlorotitanium tri-isopropoxide.

As used herein, "TiCl$_4$" refers to titanium tetrachloride.

As used herein, "TNBT" refers to tetra n-butyl titanate.

Example 1

25 mL hexane solution of 2-EHOH (125 mmol) was slowly added to the 50 mL hexane solution of BEM (50 mmol) and TEAl (5 mmol) inside the reactor. After the addition, the solution was further stirred for 1 h. Then 25 mL hexane solution of Ti(OiPr)4 (38 mmol) was added slowly. After the addition, the mixture was further stirred for 1 h. Then another 25 mL hexane solution of TiCl4 (12.5 mmol) was slowly added. The solution was further stirred for 1 h. Then the agitation rate was increased to 500 RPM and neat TiCl4 (100 mmol) was dropwised added over 2 h. After the addition, the slurry was further stirred for 1 h. The agitation was stopped and the solid was washed three times with hexane, 100 mL each. Another 50 mL hexane was added, 25 mL hexane solution of TiCl4 (50 mmol) was added to the stirring slurry. After the addition, the slurry was stirred for 1 h. The solid was then washed once with 100 mL hexane. Another 50 mL hexane was added, followed by the transfer of 25 mL hexane solution of TiCl4 (50 mmol). The slurry was stirred for 1 h and then the solid was washed three times with hexane, 100 mL each. Another 50 mL hexane was added, followed by 25 mL hexane solution of TEAl (8 mmol) to the stirring slurry. The final catalyst slurry was stirred for 1 h and then collected for polymerization and characterization.

Example 2

Example 2 was prepared similarly to Example 1, except that the upfront TEAl loading was 12.5 mmol and 2-EHOH was 147 mmol in order to convert all reducing metal alkyls to non-reducing metal alkoxides.

Example 3

25 mL hexane solution of 2-EHOH (125 mmol) was slowly added to the 50 mL hexane solution of BEM (50 mmol) and TEAl (5 mmol) inside the reactor. After the addition, the solution was further stirred for 1 h. Then 50 mL hexane solution of TNBT (38 mmol) was added slowly. After the addition, the mixture was further stirred for 1 h. Then the agitation rate was increased to 500 RPM and neat TiCl$_4$ (125 mmol) was dropwised added over 2 h. After the addition, the slurry was further sitted for 1 h. The agitation was slopped and the solid was washed three times with hexane, 100 mL each. Another neat TiCl$_4$ (100 mmol) was added to the stirring slurry. After the addition, the slurry was stirred for 1 h. The solid was then washed seven times with hexane, 100 mL each. Another 50 mL hexane was added, followed by 25 mL hexane solution of TEAl (8 mmol) to the stirring slurry. The final catalyst slurry was stirred for 1 h and then collected for polymerization and characterization.

Example 4

Comparative 50 mL hexane solution of 2-EHOH (209 mmol) was slowly added to the 100 mL hexane solution of BEM (10 mmol) inside the reactor. After the addition, the solution was further stirred for 1 h. Then 100 mL hexane solution of ClTi(OiPr)$_3$ (100 mmol) was added slowly. After the addition, the mixture was further stirred for 1 h. Then 300 mL solution of TiCl$_4$/TNBT (TiCl$_4$=200 mmol and TNBT=100 mmol) was slowly added over 2 h. The solution was further sitted for 1 h. The agitation was stopped and the solid was washed three times with hexane, 200 mL each. Another 100 mL hexane was added, followed by 50 mL hexane solution of TiCl$_4$ (100 mol) to the stirring slurry. After the addition, the slurry was stirred for 1 h. The solid was then washed once with 200 mL hexane. Another 100 mL hexane was added, followed by the 50 mL hexane solution of TiCl$_4$ (100 mmol). The slurry was stirred for 1 h and then the solid was washed three times with hexane, 200 mL each. Another 100 mL hexane was added, followed by 50 mL hexane solution of TEAl (16 mmol) to the stirring slurry. The final catalyst slurry was stirred for 1 h and then collected for polymerization and characterization.

Summary of catalyst compositions and characterization is presented in Table 1. In general, all catalysts have comparable compositions.

TABLE 1

| catalyst | Ex. 1 | Ex. 2 | Ex. 3 | Ex. 4 |
| --- | --- | --- | --- | --- |
| Upfront TEAl (equiv.) | 0.10 | 0.25 | 0.10 | No |
| Titanium alkoxide | Ti(OiPr)$_4$ | Ti(OiPr)$_4$ | TNBT | Expensive blends ClTi(OiPr)3 and TiCl4/TNBT |
| D50 (μ) | 4.0 | 9.2 | 6.0 | 7.6 |
| Span | 1.5 | 32.6 | 7.4 | 1.5 |
| Al (wt %) | 2.4 | 2.3 | 2.8 | 3.6 |
| Mg (wt %) | 11.5 | 11.5 | 13.3 | 13.1 |
| Ti (wi %) | 8.5 | 6.4 | 5.4 | 8.8 |

Polymerizations with the synthesized Ziegler-Natta catalysts were performed at the following conditions: ethylene flow rate=8 SLPM (standard liters per minute). H$_2$/C$_2$ feed ratio=0.25 or 1.00, 125 psig (pound-force per square inch gauge). 80° C., [TIBAl (triisobutyl aluminum)]=0.25 mmol/L (mol per liter) and 1 hour in hexane. The polymerization results for Examples 1-6 are summarized in Table 2 below.

TABLE 2

| catalyst | Ex. 1 | Ex. 2 | Ex. 3 | Ex. 4 |
| --- | --- | --- | --- | --- |
| Mg based activity (g/g/h) | 21000 | 19000 | 14000 | 16000 |
| Bulk density (g/cc) | 0.42 | 0.38 | 0.39 | 0.40 |
| Fluff D50 (μ) | 113 | 196 | 156 | 225 |
| span | 0.7 | 1.2 | 0.8 | 0.9 |
| Fines (<63 μ) % | 1.4 | 0.0 | 0.0 | 0.0 |
| Wax (wt %) | 0.6 | 1.1 | 1.0 | 0.8 |
| MI2 (dg/min) | 1.1 | 2.0 | 0.7 | 1.0 |

TABLE 2-continued

| catalyst | Ex. 1 | Ex. 2 | Ex. 3 | Ex. 4 |
|---|---|---|---|---|
| MI5 (dg/min) | 3.7 | 6.9 | 2.2 | 3.5 |
| HLMI (dg/min) | 44.1 | 92.5 | 30.2 | 42.3 |
| SR2 | 38.7 | 46.1 | 45.2 | 41.3 |
| SR5 | 11.9 | 13.4 | 13.6 | 12.3 |
| Mn (g/mol) | 18,000 | 16,000 | 20,000 | 19,000 |
| Mw (g/mol) | 134,000 | 118,000 | 144,000 | 133,000 |
| Mz (g/mol) | 945,000 | 648,000 | 719,000 | 764,000 |
| Mw/Mn | 7.4 | 7.2 | 7.4 | 7.1 |
| Mz/Mw | 7.0 | 5.5 | 5.0 | 5.7 |
| Ea (J/mol) | 26.3 | 26.8 | 25.6 | 26.2 |
| Viscosity (Pa * s) | 1.68E4 | 8.69E3 | 2.49E4 | 2.04E4 |
| Relaxation (sec) | 0.0085 | 0.0050 | 0.0168 | 0.0101 |
| Breadth | 0.262 | 0.278 | 0.288 | 0.260 |

Table 2 showed that Example 1 and 2 made with Ti(OiPr)4 had higher catalyst activity than Example 3 made with TNBT. Increasing upfront TEAl loading, improved catalyst hydrogen responses as seen in Example 1 and Example 2. The increased hydrogen response is very interesting since from a process point of view, it helps to reduce reactor off-gas and from an application point of few, it brings advantage to produce high melt flow polymer grades. Moreover, Table 2 showed that most of the other polymer properties for Example 1~3, such as molecular weight distributions, rheology and shear properties are comparable with Comparative Example 4.

Examples 1~4 catalysts and their polymers exhibit particle size distributions and particle sizes (D50). Catalyst Examples 2~3 had broader catalyst particle size distributions than Comparative Example 4, but all polymer samples have narrow particle size distributions (span ≤1.2) and good bulked densities (~0.38 g./cc). Increasing the upfront TEAl loading increased both the catalyst and fluff D50s and reduced fines, as exemplified in Example 1 and Example 2.

FIG. 1 further illustrates the catalyst hydrogen responses for Example 2~4. While Example 3 and 4 may have similar hydrogen response. Example 2 shows higher and better hydrogen response than Comparative Example 4.

Low cost Ziegler-Natta catalyst intermediates for polyolefin production were unexpectedly obtained by modifying the Ziegler-Natta catalyst intermediates with the simplified usage of titanium alkoxides, such as the reduction of the usage of two titanium alkoxides into one, while still obtaining comparable performance and good morphology as compared to Ziegler-Natta catalyst intermediates produced with ClTi(OiPr)$_3$ and TiCl4/TNBT. Thus, by eliminating the usage of certain expensive titanium blends in the production of such Ziegler-Natta catalyst intermediates, the catalyst production can be simplified and the catalyst production costs can be decreased. In addition, with the reduction of the usage of titanium alkoxides, such as the reduction of the usage of two titanium alkoxides into one, it was unexpectedly found that solvent waste generated at precipitation was significantly reduced. Thus, by reducing the amount of solvent waste generated at precipitation, the catalyst production cost can be further decreased and catalyst batch yield can be doubled from due to decreased waste (thereby increasing the material available for reaction). Further, it was found that the addition of upfront TEAl during catalyst production resulted in increased catalyst/fluff D50. Such TEAl optimization can allow for the use of inexpensive raw materials as well as a reduction of solvent at precipitation.

While the foregoing is directed to embodiments of the present invention, other and further embodiments of the invention may be devised without departing from the basic scope thereof and the scope thereof is determined by the claims that follow.

What is claimed is:

1. A process of forming a catalyst system comprising:
   reacting a hexane solution having 2-ethyl hexanol with a hexane solution comprising butyl ethyl magnesium (BEM) and triethyl aluminum (TEAl), wherein a TEAl to BEM molar ratio is about 0.5:1 to form a first compound comprising a non-reducing magnesium-aluminum alkoxide;
   contacting the first compound with a first agent and a second agent in the presence of an inert hydrocarbon solvent to form a solution of reaction product "A", the first agent consisting of titanium isopropoxide (Ti(O$^i$Pr)$_4$) and the second agent comprising a first metal halide;
   contacting the solution of reaction product "A" with a second metal halide to form a solid reaction product "B";
   washing the solid reaction product "B" with hexane;
   contacting the solid reaction product "B" with a fourth agent to form a solid reaction product "C", the fourth agent comprising a third metal halide, wherein the fourth agent contacts solid reaction product "B" in a molar equivalent of about 0.1;
   optionally contacting the solid reaction product "C" with a fifth agent to form a solid reaction product "D", the fifth agent comprising a fourth metal halide; and
   contacting the solid reaction product "C" or "D" with a sixth agent to form a catalyst component, the sixth agent comprising a first organoaluminum compound, wherein the catalyst system is formed in the absence of ClTi(O$^i$Pr)$_3$ and in the absence of a blend comprising TiCl$_4$/titanium n-butoxide.

2. The process of claim 1, wherein the first agent contacts the first compound in a molar equivalent of from 0.5 to 0.75.

3. The process of claim 1, wherein the second agent contacts the first compound in a molar equivalent of from about 0.1 to about 5.

4. The process of claim 1, wherein the second agent, the second metal halide, the fourth agent and the fifth agent are each titanium tetrachloride (TiCl$_4$).

5. The process of claim 1, wherein the sixth agent comprises an organoaluminum compound selected from triethyl aluminum, trimethyl aluminum, triisobutyl aluminum or combinations thereof.

6. The process of claim 1, wherein the inert hydrocarbon solvent is an aliphatic hydrocarbon or an aromatic hydrocarbon.

7. The process of claim 1, wherein the inert hydrocarbon solvent is hexane, heptane, octane, decane, toluene, xylene, dichloromethane, chloroform, 1-chlorobutane or combinations thereof.

8. The process of claim 1, wherein contact of the first compound with the second agent occurs in the presence of the first agent.

9. The process of claim 1, wherein the second agent contacts the first compound before contact with the first agent.

10. A process of forming a catalyst system comprising:

reacting a hexane solution having 2-ethyl hexanol with a hexane solution comprising butyl ethyl magnesium (BEM) and triethyl aluminum (TEAl), wherein a TEAl to BEM molar ratio is about 0.5:1 to form a first compound comprising a non-reducing magnesium-aluminum alkoxide;

contacting the first compound with a first agent and a second agent in the presence of an inert hydrocarbon solvent to form a solution of reaction product "A", the first agent comprising a titanating agent and the second agent comprising a first metal halide;

contacting the solution of reaction product "A" with a second metal halide to form a solid reaction product "B";

washing the solid reaction product "B" with hexane;

contacting the solid reaction product "B" with a fourth agent to form a solid reaction product "C", the fourth agent comprising a third metal halide, wherein the fourth agent contacts solid reaction product "B" in a molar equivalent of about 0.1;

contacting the solid reaction product "C" with a fifth agent to form a solid reaction product "D", the fifth agent comprising a fourth metal halide, wherein the fifth agent contacts solid reaction product "C" in a molar equivalent of about 0.1; and contacting the solid reaction product "D" with a sixth agent to form a catalyst component, the sixth agent comprising a first organoaluminum compound, wherein the catalyst system is formed in the absence of absence of $ClTi(OiPr)_3$ and in the absence of a blend comprising $TiCl_4$/titanium n-butoxide.

* * * * *

UNITED STATES PATENT AND TRADEMARK OFFICE
CERTIFICATE OF CORRECTION

PATENT NO. : 10,711,077 B2  
APPLICATION NO. : 13/022021  
DATED : July 14, 2020  
INVENTOR(S) : Lei Zhang, Kenneth Blackmon and David Rauscher Page 1 of 1

It is certified that error appears in the above-identified patent and that said Letters Patent is hereby corrected as shown below:

On the Title Page

Under (73) Assignee, "FINA TECHNOLOGY, INC., Houston, TX (US)" should be TOTAL AMERICAN SERVICES, INC., Houston, TX (US)

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*